United States Patent [19]
Smida

[11] 3,813,751
[45] June 4, 1974

[54] HYDRAULIC CHUCK

[76] Inventor: George R. Smida, 6912 Lombardy Ln., Minneapolis, Minn. 55428

[22] Filed: Nov. 22, 1972

[21] Appl. No.: 308,736

[52] U.S. Cl. .............................. 29/202 D, 29/252
[51] Int. Cl. ...................... B23p 15/26, B23p 19/04
[58] Field of Search... 29/202 D, 202 R, 252, 200 B

[56] References Cited
UNITED STATES PATENTS
3,585,701   6/1971   Stary.............................. 29/202 D Primary Examiner—Thomas H. Eager
Attorney, Agent, or Firm—Wicks & Nemer

[57] ABSTRACT

An hydraulic chuck including a cylinder having an opening at the inner end thereof, a cap with a tapered bore mounted on the outer end of the cylinder, a piston having a bore and slidably mounted in the cylinder with a plurality of circumferentially spaced axially and radially movable tube-gripping jaws mounted on the outer end of the piston and engageably with the tapered bore of the cylinder for compression of the jaws upon a tube together with the piston having an annular receiver formed in the outer end for the reception of a tube therein and sealing means carried internally of the piston at said receiver means for engagement with the outer surface of a tube to be expanded.

9 Claims, 6 Drawing Figures

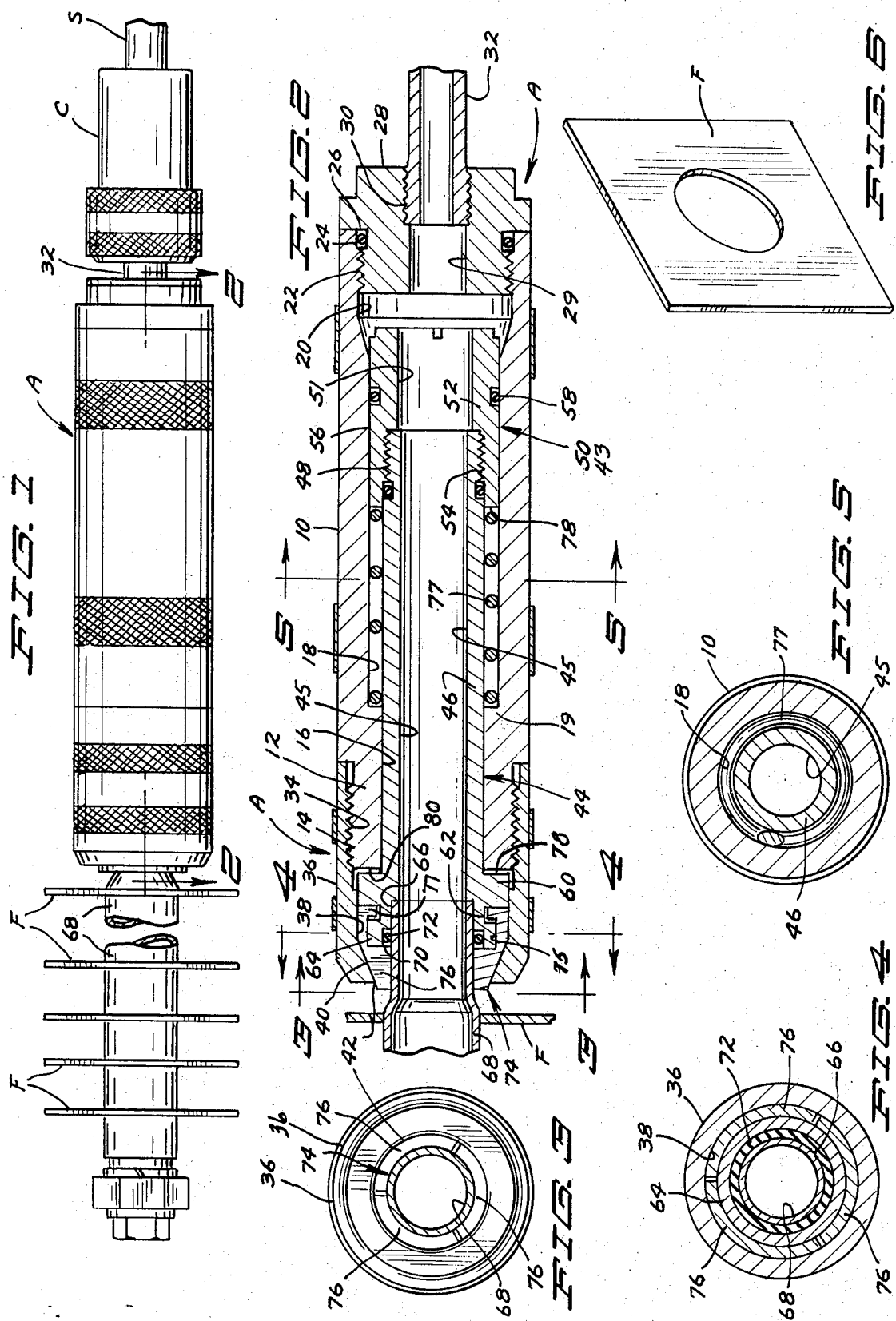

3,813,751

HYDRAULIC CHUCK

SUMMARY

The invention relates broadly to chucks and more specifically to a hydraulic chuck for tightly gripping one end of an elongated tube and simultaneously delivering fluid to the tube to expand the same into tight engagement with openings of fins mounted on the tube. It is an object of the invention to provide a chuck whereby a variance in wall thickness of the tube does not require a change in the chuck. It is a further object to provide an hydraulic chuck which has no restriction on the prefill bore and one with which the seal is made on the outside of the tube.

In the drawings forming part of this application:

FIG. 1 is a longitudinal side elevation view of a hydraulic chuck embodying the invention and illustrated as applied to a tube and fin assembly.

FIG. 2 is a front end view thereof.

FIG. 3 is a sectional view on the line 3—3 of FIG. 1.

FIG. 4 is a sectional view on the line 4—4 of FIG. 1.

FIG. 5 is a sectional view on the line 5—5 of FIG. 1.

FIG. 6 is a perspective view of a fin.

Referring to the drawings in detail, the chuck A includes the generally hollow main cylindrical body 10 formed with the front reduced portion 12 which is threaded at 14. The body 10 includes the front bore portion 16 which terminates at its rear end in the enlarged substantially central bore 18. The bore 18 terminates in the rear bore portion 20 which is threaded at 22 and formed with the recess 24 and in which is positioned the O-ring 26. The forward end of the bore 18 terminates in the shoulder 19. The numeral 28 designates a rear head which is threaded at its reduced inner end and engaged with the internal threads 22 of the rear end of the body 10. The rear head 28 is formed with the axial bore 29 which is threaded as at 30 for threadedly receiving the threaded end of the tube 32 connected to the conventional quick disconnect coupler C which is connected to a supply line S of fluid pressure.

The threads 14 of the body 10 engage the internal threads 34 of the generally cylindrical hollow front cap 36. The threads 34 terminate in the annular recess portion 38 which terminates in the tapered bore portion 40 terminating in the axial opening 42.

The numeral 44 designates a generally cylindrical and hollow piston nose as part of the piston 43 which is slidably mounted within the front bore portion 16 and formed of the hollow cylindrical portion 46 which is threaded at the inner end as at 48. The hollow cylindrical piston nose 44 has the bore 45. The piston 43 includes the hollow cylindrical portion 52 producing the bore 51 and the same is internally threaded at its outer end as at 54 and engaged with the threads 48 of the piston nose. The outer surface of the piston 43 is formed with an annular recess 56 in which is positioned the O-ring 58 for sealing engagement of the piston nose 44 with the bore 18.

The forward end of the piston nose 44 is formed with the annular flange portion 60 terminating at its outer edge in the annular groove 62 which in turn terminates in the annular flange 64. The inner surface of the forward portion of the bore of the piston nose is formed with the annular recess 66 which receives the end of the tubing 68, in alignment with the bore 45 of the piston nose and the surface of the annular recess 66 is formed with the annular groove 70 in which is positioned the O-ring 72 radially within the annular flange 64 to provide a seal between the outer surface of the tubing 68 and the outer end of the piston nose 44. It will be noted that the bore 45 of the piston is substantially that of the tube whereby there is no restriction on the fluid flow. Also with the jaws gripping upon the outer surface of the tube and with no mandrel in the tube, a variance in the thickness of the wall of a tube is of no consequence.

The numeral 74 designates a collet having three cross-sectionally arcuate tube gripping jaws 76 positioned in circumferentially spaced relationship in the front cap 36. Each of the jaws 76 includes an arcuate internal recess 75 which receives the annular flange 64 and each jaw includes an arcuate flange 77 which fits in the annular groove 62. The piston nose 44 in an unpressurized state is urged rearwardly by means of the coil spring 77 mounted on the nose and in abutment with the shoulder 19 of the bore 18 and the forward end 78 of the piston. In this position of the piston 43 and nose 44 thereof, the gripping jaws 76 are disposed in an axially inward position with the surfaces thereof out of engagement with the tapered bore 40. Also the radial edge 78 of the flange 60 abuts the front edge 80 of the reduced end portion 12 of the body 10, and when the edge 78 abuts the edge 80 the jaws 76 are out of contact with the tapered bore 40. The space between the edges 78 and 80 allow movement of the collet.

In use the chuck is positioned on the end portion of the tube 68 and fluid under pressure is admitted to the chuck A through the fitting C and rear head 28. The fluid flows through the aligned bores 51 and 45 into the tube 68 whereby the tube is filled. The fluid pressure is increased and as a result the piston 43 and piston nose 44 thereon are moved axially outwardly toward the finned radiator assembly R. As a result the surfaces of the jaws 76 engage the tapered bore 40 of the front cap 36 whereby the gripping jaws 76 are cammed into tight gripping engagement with the outer surface of the end of the tube 68. As the fluid pressure is further increased in the chuck A and tube 68, the tube outwardly of the gripping jaws is caused to radially expand into tight engagement with the edges of the holes of the fins F. Each of the fins F is formed with a hole therein and through which the tube 68 extends.

When the tube 68 is properly expanded so as to provide the tight engagement with the holes in fins F pressure on the fluid in the chuck is released by conventional means, not shown, connected to the supply line S. As a result the spring 77 moves the piston and piston nose toward the rear head 28 with the collet jaws 76 moved axially inwardly out of engagement with the tapered bore portion 40 and released from gripping engagement with the tube 68.

I claim:

1. An hydraulic chuck comprising:

a. a cylinder having an opening at the inner end thereof,
b. the outer end of the cylinder having
c. a tapered bore,
d. a piston having a bore and slidably mounted in said cylinder, e. a plurality of circumferentially spaced axially and radially movable tube-gripping jaws mounted on the outer end of said piston and engageably with the tapered bore of said cylinder for compression of the jaws upon a tube,
f. said piston having receiver means formed in the outer end for the reception of a tube therein,
g. sealing means carried internally of the piston at said receiver means for engagement with the outer surface of a tube to be expanded.

2. The device of claim 1 in which said receiver means of said piston includes an annular recess.

3. The device of claim 2 in which
   a. said sealing means includes an annular recess formed in said piston in which is positioned
   b. an O-ring for sealing engagement with the surface of a tube to be expanded.

4. The device of claim 2 in which the outer end of the cylinder is in the form of a cap mounted thereon and in which the tapered bore is formed.

5. The device of claim 4 in which the bore of the piston is substantially the same as the inside diameter of the tube to be expanded.

6. The device of claim 1 in which
   a. said sealing means includes an annular recess formed in said piston in which is positioned
   b. an O-ring for sealing engagement with the surface of a tube to be expanded.

7. The device of claim 1 in which the outer end of the cylinder is in the form of a cap mounted thereon and in which the tapered bore is formed.

8. The device of claim 1 in which the bore of the piston is substantially the same as the inside diameter of the tube to be expanded.

9. The device of claim 1 in which
   a. said sealing means includes an annular recess formed in said piston in which is positioned
   b. an O-ring for sealing engagement with the surface of a tube to be expanded.

* * * * *